United States Patent
Kreiner et al.

(10) Patent No.: US 6,729,683 B2
(45) Date of Patent: May 4, 2004

(54) LIFT-UP VEHICLE SUNROOF WITH WIND LOAD COMPENSATION AND METHOD FOR OPERATING THE SAME

(75) Inventors: Steffen Kreiner, Esslingen (DE); Andreas Rodewald, Herrenberg (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/959,535

(22) PCT Filed: Feb. 23, 2001

(86) PCT No.: PCT/EP01/02057
§ 371 (c)(1),
(2), (4) Date: Jan. 17, 2002

(87) PCT Pub. No.: WO01/64466
PCT Pub. Date: Sep. 7, 2001

(65) Prior Publication Data
US 2003/0047967 A1 Mar. 13, 2003

(30) Foreign Application Priority Data
Feb. 29, 2000 (DE) .......................... 100 09 599

(51) Int. Cl.⁷ .............................. B60J 7/057; B60J 7/05
(52) U.S. Cl. ....................................... 296/223; 296/221
(58) Field of Search ............................... 296/223, 221

(56) References Cited
U.S. PATENT DOCUMENTS

| | | | |
|---|---|---|---|
| 4,835,449 A | * | 5/1989 | Huehn ........................ 318/282 |
| 4,914,367 A | | 4/1990 | Niewiadomski et al. |
| 5,045,765 A | * | 9/1991 | Wissler ...................... 318/382 |
| 5,734,727 A | | 3/1998 | Flaherty et al. |
| 6,002,227 A | | 12/1999 | Lamm et al. |
| 6,174,025 B1 | * | 1/2001 | Henderson et al. ......... 296/217 |
| 6,290,288 B1 | * | 9/2001 | Ritter et al. ................ 296/221 |
| 6,588,835 B2 | * | 7/2003 | Horiuchi et al. ........... 296/221 |

FOREIGN PATENT DOCUMENTS

| | | |
|---|---|---|
| DE | 3840724 C2 | 4/1999 |
| EP | 0692 400 B1 | 1/1996 |

* cited by examiner

*Primary Examiner*—Dennis H. Pedder
(74) *Attorney, Agent, or Firm*—Crowell & Moring LLP

(57) ABSTRACT

In a method and a device for operation of a cover of a tilt-and-slide sunroof of a vehicle, the cover is arranged in a first relative position in relation to a roof panel surrounding the cover when the vehicle is stationary. The cover is moved from the first relative position into a second relative position by a vacuum force caused by an air stream when the vehicle is in motion. A physical variable correlating with the vacuum force is registered, and adjustment of the position of the cover by the cover drive as a function of the variable registered, counter to the direction of the vacuum force from the second relative position into a third relative position essentially coinciding with the first relative position, is performed. In its closed position, therefore, the cover always lies in the same relative position to the roof panel surrounding it, regardless of the vehicle speed.

15 Claims, 3 Drawing Sheets

LIFT-UP VEHICLE SUNROOF WITH WIND LOAD COMPENSATION AND METHOD FOR OPERATING THE SAME

BACKGROUND AND SUMMARY OF THE INVENTION

The present invention relates to a method for the operation of a cover of a tilting sunroof, especially a slide-and-tilt sunroof, for closing the roof opening of a vehicle by means of a cover drive. The cover is arranged in a first relative position in relation to a roof panel surrounding the cover when the vehicle is stationary, and the cover is moved from the first relative position into a second relative position by a vacuum force caused by an air stream when the vehicle is in motion. The invention also relates to a corresponding control device and to a slide-and-tilt sunroof system of a motor vehicle.

German patent publication DE 38 40 724 C2 discloses a slide-and-tilt sunroof of a motor vehicle, in which a cover can be adjusted by means of an electric motor, which is reversible in its direction of rotation, in order to provide an open or closed position of the cover in relation to a roof opening of the motor vehicle.

Mechanical play that is always present and a natural lack of inherent rigidity in the tilt-and-slide sunroof assembly mean that the support forces of the adjusting mechanism are not sufficient to keep the cover in a single resting position both when the vehicle is stationary and when it is moving at high speed. This is due to vacuum forces acting on the cover, which are caused by the air stream flowing past the cover and which give rise to a force component directed towards the outside of the vehicle in the Z-direction of the vehicle and acting on the cover, which displaces the cover outwards from its rest position. As a result, the overlap between the sliding sunroof cover and the roof panel or any seal arranged at the edge of the roof opening is lost, and a gap is created, which leads to pronounced wind and whistling noises. The displacement of the cover, moreover, gives the motor vehicle roof panel a visually unattractive overall appearance.

One known solution is to set the rest position of the cover correspondingly low in the Z-direction of the vehicle. Any vacuum forces occurring due to travel at most displace the cover into a position in which the surface of the cover is essentially flush with the surrounding roof panel. This has the unwelcome disadvantage, however, that water collects on the outside of the cover when the vehicle is stationary.

It should be noted that the mechanical play in the roof guide is necessary for technical reasons, since canting of the cover on the cover support or guide would otherwise frequently occur during the cover operating movement, resulting in operating malfunctions. The inadequate inherent rigidity in the tilt-and-slide sunroof assembly essentially stems from the fact that a compromise always has to be made in the case of vehicle components between mechanical stability and inherent weight, which naturally leads to limitations in terms of stability.

European patent publication EP 0 692 400 B1, moreover, discloses an electrical positioning drive suitable for the operation of such a tilt-and-slide sunroof. The drive has a switch wheel driven by a motor and on which permanent magnetic markings are applied. Hall sensors are also provided, which are arranged in such a way that they generate signals according to the permanent magnetic markings. An electronic unit analyzes these signals together with actuating signals fed in by a user and converts them into corresponding motor signals. The motor then turns the switch wheel on its positioning travel.

One object of the present invention is to specify a method and a control device for the operation of a tilting sunroof as described which avoids the aforementioned disadvantages of the prior art. It is intended, in particular, to create a tilting sunroof system which, even at high vehicle speeds, permits an automatic adjustment of the sliding sunroof cover to the roof panel surrounding the cover.

One characteristic feature of the method proposed according to the invention resides in the registering of a physical variable correlating with the vacuum force and in corresponding adjustment of the position of the cover by means of the cover drive unit counter to the direction of the vacuum force from the second relative position into a third relative position as a function of the variable registered. This enables the cover in its closed position to lie in the same relative position to the roof panel surrounding it at all times, regardless of the driving mode. When correspondingly adjusted, this single zero position gives a visually positive overall impression of the outer surface in the transitional area between cover and adjoining roof panel. Any loss of overlap occurring between the tilting sunroof cover and the surrounding roof panel is compensated for by the fact that the cover is, so to speak, actively returned to the original position, thereby restoring the original overlap. This, consequently, also permits automatic compensation for the mechanical play of the tilting sunroof system and for the lack of inherent rigidity in the tilting sunroof.

In addition, wind and whistling noises often occurring at higher vehicle speeds, together with a separation of the laminar flow, which would lead to an increase in the drag coefficient of the vehicle body, are effectively prevented.

In particular, the method proposed can be easily and cost-effectively applied or implemented without the need for modifications to the tilting sunroof mechanism, the drive mechanism or the control electronics.

The third relative position preferably essentially coincides with the first relative position.

All physical variables having a functional correlation with the vacuum force acting on the tilting sunroof cover may be used as variables correlating with the vacuum force. Thus, for example, the instantaneous speed of the vehicle, the change in the position of the cover occurring in the direction of the vacuum force, or the wind noises occurring on the cover due to the air stream, especially at the transition between the cover and the roof panel surrounding the cover, may be used. These variables may be used both as alternatives and in addition to one another.

In one development of the method according to the invention, provision may be made for adjustment of the position of the cover only once a first threshold value of the variable is exceeded. This facilitates an especially simple and cost-effective implementation of the method, since only one further switch point has to be provided in the tilting sunroof drive. At the same time, the cover drive may also advantageously have an additional shut-off position, which is adopted on exceeding the upper threshold value for the variable and abandoned again when the variable falls below a lower threshold value.

In a further development, provision may be made for continuous registering of the physical variable and continuous, corresponding adjustment of the position of the cover. Although this development calls for greater technical requirements, it is consistent with increased ride comfort and more economical fuel consumption, since the position of the tilting sunroof cover can be (continuously) optimized over the entire speed range.

In a particular development, provision can be made for continuous operation from the first threshold value onwards, it being possible to select the threshold value so that no measurable displacements of the cover occur below the threshold value. The latter assumption is highly realistic inasmuch as the functional correlation between the vehicle speed, for example, and the vacuum force occasioned thereby will generally not be linear, and will certainly for most vehicle bodies follow a higher power correlation, so that an appreciable vacuum is consequently built up only at higher speeds.

The control device likewise proposed according to the invention for the operation of such a tilting sunroof cover provides, in particular, for sensors for registering the physical variable or physical variables, and for control devices generating a cover drive control signal correlating with the particular variable registered. On the basis of the control signal, the cover drive moves the cover from the second relative position into a third relative position, in order as far as possible to restore the overlap of the cover with the roof panel. Depending on the respective physical variable, first sensor devices for registering an instantaneous speed of the vehicle, second sensor devices for registering any variation in the position of the cover occurring in the direction of the vacuum force, and/or third sensor devices for registering wind noises occurring on the cover as a result of the air stream may be provided. The sensor devices may be used as alternatives and in addition to one another.

According to one embodiment, corresponding first, second, and/or third sensor devices may be provided for continuously registering the variable or variables, and control devices may be provided for continuously generating a corresponding control signal for the cover drive.

The tilting sunroof system further proposed according to the invention provides for a cover drive mechanism having an additional mechanical switch or engagement point corresponding to the third relative position of the cover.

In accordance with the aforementioned, the invention may be implemented in widely varying ways, that is by reprogramming of a control program (software) loaded into a control module for operation of the tilting sunroof, or alternatively through minor modifications to the mechanical or electrical part of the tilting sunroof drive.

Furthermore, tilt-and-slide sunroofs operated according to the invention can, with the aforementioned advantages, also be fitted to vehicles, especially motor vehicles, of various types. The advantages are experienced in particular at very high vehicle speeds of 150 km/h and upwards.

The invention will be explained in more detail below with reference to exemplary embodiments represented in drawings in which identical reference numbers relate to functionally identical or similar features. Viewed in conjunction with the claims, these reveal further characteristics, features and advantages of the invention.

DETAILED DESCRIPTION OF THE DRAWINGS

Figure 1:
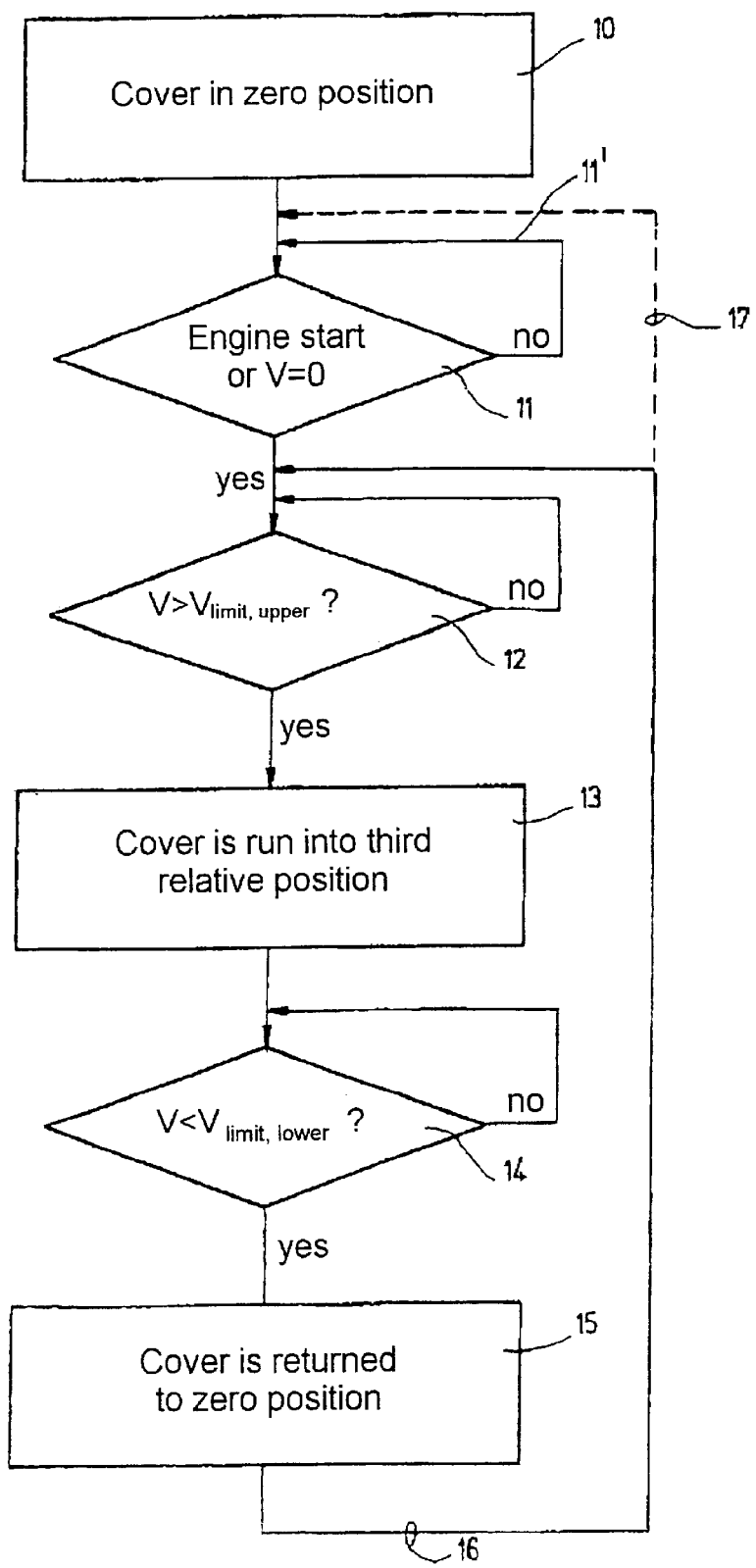
FIG. 1 shows an exemplary embodiment of the method according to the invention for the operation of a tilt-and-slide sunroof of a motor vehicle with reference to a flow chart.

In the exemplary embodiment of the method according to the invention for the operation of a cover of a tilt-slide sunroof shown in FIG. 1 it is assumed that the cover is located in a zero position, that is a "FULLY CLOSED" position 10. At the same time, it is assumed that the vehicle is stationary (v=0). In this case the algorithm shown is initially in a waiting loop 11, 11', in which it is repeatedly queried whether engine starting is taking place. Alternatively, a check can be performed here on whether the vehicle is starting to move ($v_{vehicle}$.>0) and whether a corresponding signal is present on the vehicle electrical system, e.g. on a 'CAN' bus.

As soon as it is detected that the vehicle is in motion, the sequence passes into the next waiting loop 12, in which it is queried whether the instantaneous speed v of the vehicle is greater than a pre-adjustable upper limit $V_{limit,\ upper}$. This limit is selected so that the vacuum forces produced due to the vehicle speed ("wind load") only occur in excess of this value in a range in which the cover begins to lift and is moved into a second relative position differing from the zero position.

As soon as exceeding of the limit speed is detected, the cover is moved counter to the direction of the vacuum force from the second relative position into a third relative position 13 coinciding as closely as possible with the zero position (=first relative position). The magnitude of this relative movement may vary as a function of the value of the variable registered. For the sake of simplicity, however, it is predefined.

Once the cover has been run into the third relative position, the sequence passes into the next waiting loop 14, in which it is queried whether the instantaneous speed has in the meantime fallen below a lower limit speed $V_{limit,\ lower}$ again. Should this be the case, the cover is run back into the zero position (first relative position) 15. At the same time, the sequence reverts to the waiting loop 12, in which it is queried if whether the instantaneous speed again exceeds the upper limit speed. Alternatively it may also revert to the waiting loop 11, in which it is analysed whether the vehicle is moving at all.

Figure 2:
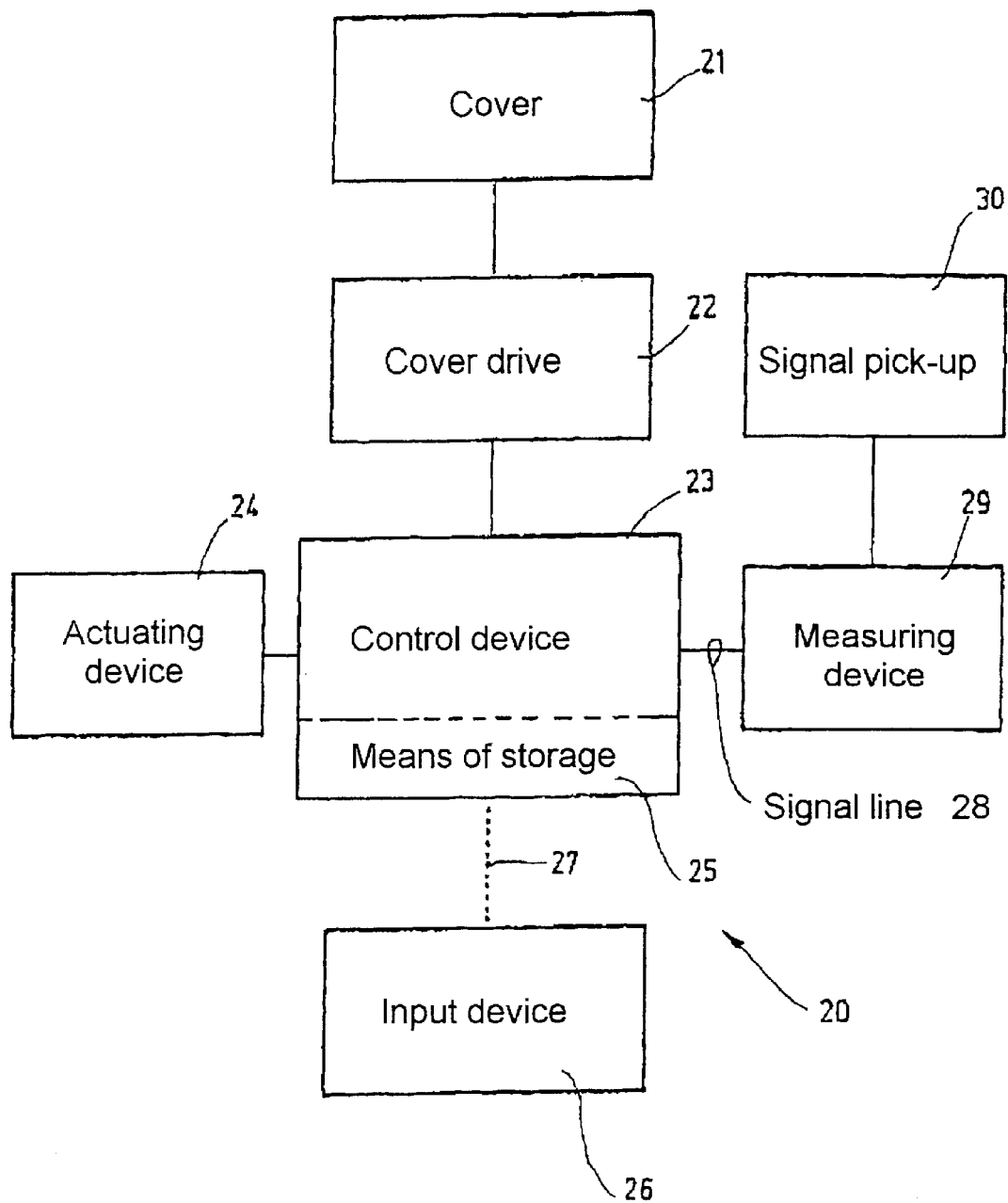
FIG. 2 shows a schematic block diagram of a tilt-and-slide sunroof system having a control device according to the invention.

The tilt-and-slide sunroof system 20 according to FIG. 2 contains a tilt-and-slide sunroof with a cover 21, which is driven by a cover or roof drive 22 having an electric motor not shown further here. It should be noted that that the cover 21 here may be a purely tilting sunroof. The roof drive 22 is controlled by a control device 23. Connected to the control device 23 is an actuating device 24, such as one or more manual operating keys for actuation of the cover 21.

The control device 23 preferably contains a position counter or a position switch input with a timer control, in order to ensure a correct sequence of movements of the cover 21. The control device comprises means of storage 25 for programming the sequence of movements or the travel of the cover 21. For this purpose, the control device 23 is connected to preferably external input devices 26. This connection is preferably a detachable plug-and-socket connection 27. Predetermined or predefined characteristic data for the sequence of movements of the cover 21 are programmed into the control device 23 by means of the input devices 26. These predefined data consist, for example, of the length of the maximum lifting movement of the cover 21 or predefined values for the upper and lower limits of the instantaneous speed. The cover 21 is automatically run into the required closed position by the programming of its sequence of movements or its travel.

By way of signal line 28, the control device 23 receives the value of the current speed v of the vehicle from a measuring device 29 interacting with a signal pick-up 30. In the control device 23, this value is compared with the predetermined limits programmed in, according to the procedure described with reference to FIG. 1.

In addition to the current speed v, the control device 23 can receive and process further measurement signals for other physical variables by way of the signal line 28. Thus, a plurality of different variables, such as the speed and the actual cover position can be used cumulatively, that is simultaneously with one another. For example, the instantaneous speed can be used as a reference variable for the limits, and the magnitude of any compensatory relative movement of the cover 21 can be determined from the current value for the cover displacement as a result of the vacuum. Other combinations are accordingly feasible.

Figure 3A:
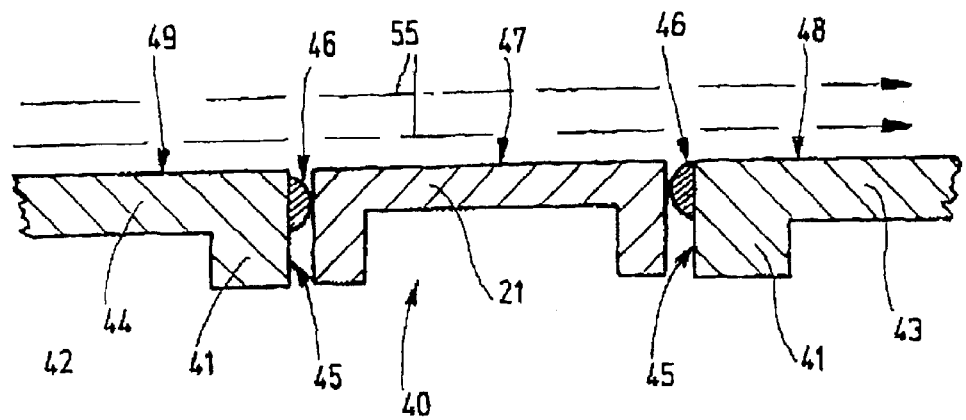
FIGS. 3a to 3c show diagrams of the positions of a cover of a tilt-and-slide sunroof system in its function as a tilting sunroof in an operating sequence according to the invention.
Figure 3B:
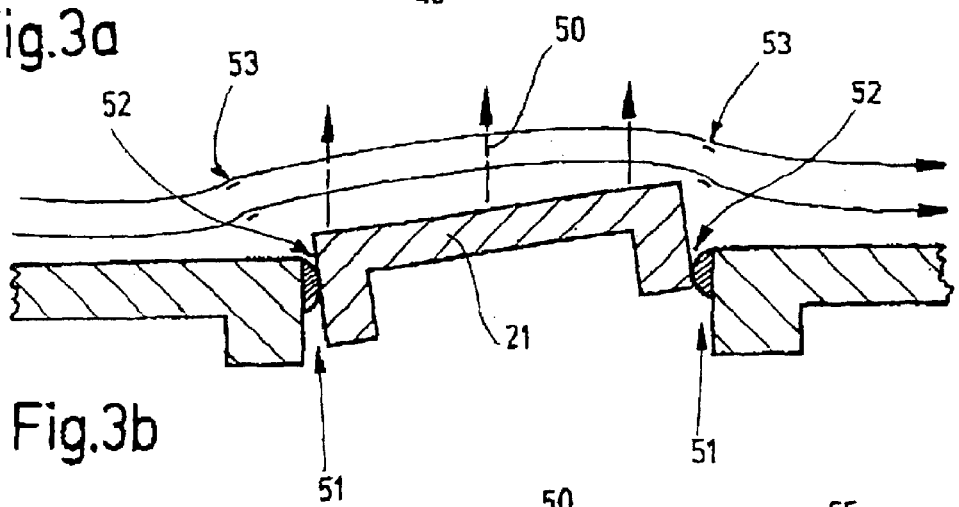
Figure 3C:
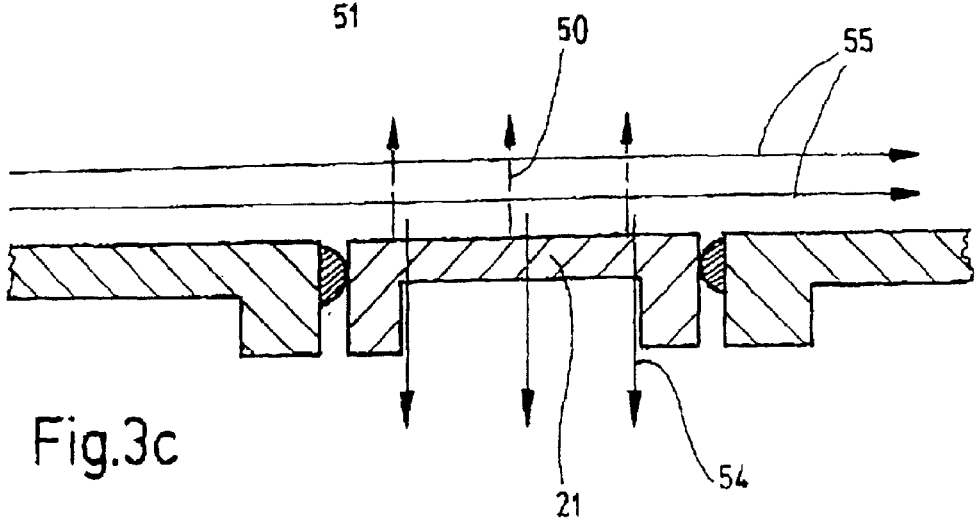

The method for the operation of the cover 21 of a tilt-and-slide sunroof for closing a roof opening 40 of a motor vehicle is explained below (FIGS. 3a–c). The roof opening 40 is surrounded by a fixed roof part 41, that is a fixed roof panel of the vehicle. The roof part 41, represented diagrammatically and only in part, has a rear roof area 43 and a front roof area 44 viewed in the direction of movement 42 of the vehicle. The inner edge 45 of the roof opening 40 is fitted with a usually enclosed seal 46 arranged in a transverse plane to the plane of the drawing sheet.

In FIG. 3a, the cover 21 is in the closed position. In this position, the cover surface 47 is flush with each of the surfaces 48, 49. Only two of a total of four surfaces are visible in this representation. As the vehicle starts to move, therefore, an overall laminar air flow 55 will develop on the vehicle surface shown, which will enhance the drag coefficient of the vehicle.

As speed increases (FIG. 2b), a partial vacuum 50 will be formed on the cover 21 according to the Bernoulli equation due to the air stream flowing past the upper side, which will lead to the cover 21 being pulled outwards out of the cover-roof assembly. At the same time, gaps 52 form at the transitions 51 to the roof panel, which lead to the development of noise. Furthermore, owing to the separation of the laminar flow, vortices 53 (localized turbulent flow) form in the area of the gaps 52. These vortices having a detrimental effect on the drag coefficient of the vehicle body.

In order to counteract this cover displacement, the cover 21 is now actively moved, that is to say by means of the cover drive 22, in the direction 54 back into the initial position. As a result, the cover 21, despite the high vacuum forces 50 still acting on the cover 21, again assumes its original position shown in FIG. 3a and the flow around vehicle roof is again entirely laminar 55 in the area shown.

It should be mentioned that the features and advantages represented in the description above apply both to a tilting sunroof and to a slide-and-tilt sunroof.

What is claimed is:

1. A method for operating a cover of a tilting sunroof for closing a roof opening of a vehicle by way of a cover drive, the cover being arranged in a closed position in relation to a roof panel surrounding the cover when the vehicle is stationary, and displaced from the closed position into a second relative position by a vacuum force caused by an air stream when the vehicle is in motion, comprising:

registering a physical variable correlating with the vacuum force; and adjusting the position of the cover by way of the cover drive, as a function of the variable registered, counter to a direction of the vacuum force from the second relative position into a third relative position which coincides with the closed position.

2. The method according to claim 1, wherein said physical variable includes at least one of an instantaneous speed of the vehicle, a change in position of the cover occurring in the direction of the vacuum force, and wind noises occurring due to the air stream on the cover, especially at the transition between the cover and the roof panel surrounding the cover.

3. The method according to claim 1, wherein the position of the cover is adjusted only after an upper threshold value of the registered physical variable is exceeded.

4. The method according to claim 1, wherein the physical variable is continuously registered and the position of the cover is continuously adjusted in accordance with the physical variable.

5. The method according to claim 1, wherein said tilting sunroof is a slide-and-tilt sunroof.

6. The method according to claim 2, wherein the position of the cover is adjusted only after an upper threshold value of the registered physical variable is exceeded.

7. The method according to claim 2, wherein the physical variable is continuously registered and the position of the cover is continuously adjusted in accordance with the physical variable.

8. The method according to claim 3, wherein the physical variable is continuously registered and the position of the cover is continuously adjusted in accordance with the physical variable.

9. The method according to claim 8, wherein the physical variable is continuously registered only in excess of the upper threshold value.

10. A control device for operating a tilting sunroof system having a cover for closing a roof opening of a vehicle by way of a cover drive, the cover being arranged in a closed position in relation to a roof panel surrounding the cover when the vehicle is stationary, and the cover being acted upon by a vacuum force caused by an air stream when the vehicle is in motion and being correspondingly displaceable from the closed position into a second relative position, the control device comprising:

sensor devices for registering a physical variable correlating with the vacuum force; and a control device for generating a control signal for the cover drive correlating with the physical variable registered, as a result of which the position of the cover can be moved counter to a direction of the vacuum force by the cover drive from the second relative position into a third relative position which coincides with the closed position.

11. The control device according to claim 10, and further comprising at least one of first sensor devices for registering an instantaneous speed of the vehicle, second sensor devices for registering a change in the position of the cover occurring in the direction of the vacuum force, and third sensor devices for registering wind noises occurring on the cover due to the air stream.

12. The control device according to claim 10, and further comprising at least one of first, second, and third sensor devices for continuously registering the physical variable or variables, and control devices for continuously generating a corresponding control signal for the cover drive.

13. The control device according to claim 10, wherein said tilting sunroof system is a tilt-and-slide sunroof system.

14. A tilting sunroof system of a motor vehicle comprising a cover for closing a roof opening of the vehicle by way of a drive mechanism interacting with a cover drive, the cover being arranged in a closed position in relation to a roof panel surrounding the cover when the vehicle is stationary, the cover being acted upon by a vacuum force caused by an air stream and being correspondingly displaceable from the closed position into a second relative position when the vehicle is in motion, the cover drive adapted to change a position of the cover as a function of a physical variable correlating with the vacuum force counter to the direction of the vacuum force from the second relative position into a third relative position which coincides with the closed position, the drive mechanism having a mechanical switch corresponding to the third relative position.

15. The tilting sunroof system according to claim 14, wherein said tilting sunroof system is a tilt-and-slide sunroof system.

* * * * *